(12) United States Patent
Price

(10) Patent No.: X8483
(45) Date of Patent: Oct. 31, 1834

(54) TRUSS, FOR HERNIA

(76) Inventor: John L. Price

United States Patent Patent No.: X8483

John L. Price.

Letters Patent.

The Schedule referred to in these Letters Patent and
making part of the same, containing a description in the words of the
said John L. Price, himself of his improvement in the construction of a
metallic Truss, for the cure of Hernia.

To all to whom these presents shall come.
Be it known, that I John L. Price of the Town of Nicholasville in
the County of Jessamine, and State of Kentucky, have invented a new
and useful improvement in Surgery, in the construction of a Metallic
Truss, for the immediate relief and ultimate cure of Hernia,
and that the following is a full and exact description of the
construction and operation of said Truss, as improved by me.
A plane convex ball of lead the convexity terminating in an
obtuse apex base oval; the plane surface has five screws
fixed in it; to two of the end screws, an elastic leather band
or belt sufficiently long to pass around the body is permanently
fastened to the other two end screws, and the centre screw, are
fastened three short leather straps and buckles_ the two
buckles on the end are for the purpose of receiving two straps
the opposite end of the elastic leather band or belt to that which
is fastened to the Truss, by which after the band is passed
around the hips below the anterior superior spinus process
of the illium, the Truss is tightly & securely fastened within
the aperture or opening through which the Hernia protrudes.
To the leather band that passes around the body and from
four to eight inches from the Metallic Truss, a strap is sewed
called a thigh strap, that passes obliquely around the thigh,
or rather over the glutei muscles above the head of the thigh
bone, and around the upper back & front part of the thigh and
is Drawing and is fastened to the buckle attached to the centre screw for the purpose of more securely fastening the Truss to the part to which it is applied, and preventing the apex of the instrument from turning down which would remove its pressure from the neck of the sack in scrotal and femoral Hernia, and consequently permit the escape of the bowel or other viscera in either of these varieties of the disease. This metallic Truss, with its bands for the body & thigh, as above described, is designed to give immediate relief, and ultimately, radically cure scrotal, femoral, inguinal and ventral Hernia, and with a shoulder strap instead of a thigh strap umbilical Hernia after the protruding viscera is reduced (returned to its or their proper cavity) the aperture through which the bowel or omentum, or both, or other viscera passed, is to be found, into which the apex of the Truss is to be introduced, and and tightly fastened there by means of the bands that pass around the hips and thigh, and the buckles designed for their reception. By the pressure thus applied by the elastic bands and the weight of the truss, the largest scrotal and femoral Hernia can be securely kept up. The apex of the Truss presses on the neck of the sack in these two varieties of Hernia (scrotal and femoral) and keeps it empty and by its continual pressure exites irritation, and a slight degree of inflamation and effusion of coagulable lymph, by which actual agglutination of the neck of the sack takes place and produces a radical cure. In Inguinal & ventral Hernia, there is simply a tumour like protrusion of the viscera at the abdominal ring, in the one case, and through some part of the walls of the abdomen in the other. The Truss is applied to these varieties of the disease, in the same manner that it is to the others (scrotal and femoral). In inguinal Hernia it acts upon the same principle, and closes the abdominal ring. In ventral and umbilical Hernia, the pressure of the Truss affords affords a radical cure, by confining the protruding viscera
within their cavity and by inducing a contraction of the
parieties in the ventral & umbilical regions of the abdomen
in obedience to a well known principle, that all hollow parts
have to adapt themselves to their contents. In umbilical Hernia
this Truss is firmly applied by buckling the band tightly around
the body, and by using a shoulder strap to keep it from descending,
instead of a thigh strap. When this Truss is applied as above
described, to Scrotal, femoral, & inguinal Hernia, it has a
rotary motion up and down, and from side to side, and accomo-
dates itself to the various motions of the body, while at the
same time, its apex is fixed and keeps up a proper degree of
Pressure. As it can be worn without inconvenience, it is not
to be taken off day or night, until a radical cure is effected
in all or either of the five varieties of Hernia enumerated. It
is the only truss in existance, that I have any knowledge of.
that is equally applicable to these different varieties of this
disease, and that will as certainly give immediate relief
and ultimately cure, as that it is applied. From the suc-
cessful trials I have made on labouring men, as well as on
those who can, and do take their ease, I am fully convinced,
that this improved Truss is better adapted to give releif to
officers & soldiers in the army & Navy, than any other ever pre-
sented for their use. a soldier or labouring man, who are the
subjects of Hernia, and unable to discharge their duty in the camp,
or on the farm, would be rendered as capable of discharging their
respective duties by the application of this Truss. as they would
be were they not the subjects of that affliction. This fact
I have demonstrated in labouring men, and trust that sol-
diers will soon enjoy the same benefits.

Witnesses
James Leigh
Saml. D. McCullough

Jno. L. Price M.D.